US010796852B2

(12) United States Patent
Kadomura et al.

(10) Patent No.: US 10,796,852 B2
(45) Date of Patent: Oct. 6, 2020

(54) FILM CAPACITOR AND METHOD FOR MANUFACTURING FILM CAPACITOR

(71) Applicant: Panasonic Intellectual Property Management Co., Ltd., Osaka (JP)

(72) Inventors: Manato Kadomura, Ishikawa (JP); Eizo Fujii, Saga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 95 days.

(21) Appl. No.: 15/925,935

(22) Filed: Mar. 20, 2018

(65) Prior Publication Data

US 2018/0211782 A1    Jul. 26, 2018

Related U.S. Application Data

(63) Continuation of application No. PCT/JP2016/004276, filed on Sep. 20, 2016.

(30) Foreign Application Priority Data

Oct. 9, 2015    (JP) ................................. 2015-200790

(51) Int. Cl.
*H01G 4/224*    (2006.01)
*H01G 4/228*    (2006.01)
(Continued)

(52) U.S. Cl.
CPC ............... *H01G 4/224* (2013.01); *H01G 2/04* (2013.01); *H01G 4/18* (2013.01); *H01G 4/228* (2013.01);
(Continued)

(58) Field of Classification Search
CPC ............ H01G 4/224; H01G 4/18; H01G 4/38; H01G 4/32; H01G 4/33; H01G 4/228; H01G 2/04
See application file for complete search history.

(56) References Cited

U.S. PATENT DOCUMENTS

2013/0222967 A1 *   8/2013   Imamura .................. H01G 2/04
                                                              361/301.3

FOREIGN PATENT DOCUMENTS

JP    2001210546 A  *  8/2001
JP    2005-012940         1/2005
(Continued)

OTHER PUBLICATIONS

English Translation of Chinese Search Report dated Mar. 28, 2019 for the related Chinese Patent Application No. 201680057836.2.
(Continued)

*Primary Examiner* — David M Sinclair
(74) *Attorney, Agent, or Firm* — McDermott Will & Emery LLP

(57) ABSTRACT

A film capacitor includes a capacitor unit, and outer packaging resin covering the capacitor unit. The capacitor unit includes a capacitor group, a first bus bar, a second bus bar, and a fixation portion. The capacitor group includes a plurality of capacitor elements. The first bus bar extracts electricity from the capacitor group. The second bus bar extracts electricity from the capacitor group. The first bus bar and the second bus bar are fixed to the fixation portion. The first bus bar includes a connection terminal part formed at one end of the first bus bar, and the second bus bar includes a connection terminal part formed at one end of the second bus bar. At least one of the connection terminal part of the first bus bar and the connection terminal part of the second bus bar is coupled to the fixation portion.

15 Claims, 11 Drawing Sheets

(51) Int. Cl.
  *H01G 4/38*    (2006.01)
  *H01G 2/04*    (2006.01)
  *H01G 13/00*   (2013.01)
  *H01G 4/18*    (2006.01)
  *H01G 4/33*    (2006.01)
  *H02G 5/02*    (2006.01)

(52) U.S. Cl.
  CPC .............. *H01G 4/33* (2013.01); *H01G 4/38* (2013.01); *H01G 13/00* (2013.01); *H02G 5/02* (2013.01)

(56) References Cited

FOREIGN PATENT DOCUMENTS

| JP | 2007-109775 A |   | 4/2007 |            |
|----|---------------|---|--------|------------|
| JP | 2009105108 A  | * | 5/2009 |            |
| JP | 2010182914 A  | * | 8/2010 |            |
| JP | 2012134338 A  | * | 7/2012 | H01L 21/046 |
| JP | 2014-216453   |   | 11/2014 |           |

OTHER PUBLICATIONS

International Search Report of PCT application No. PCT/JP2016/004276 dated Nov. 29, 2016.

* cited by examiner

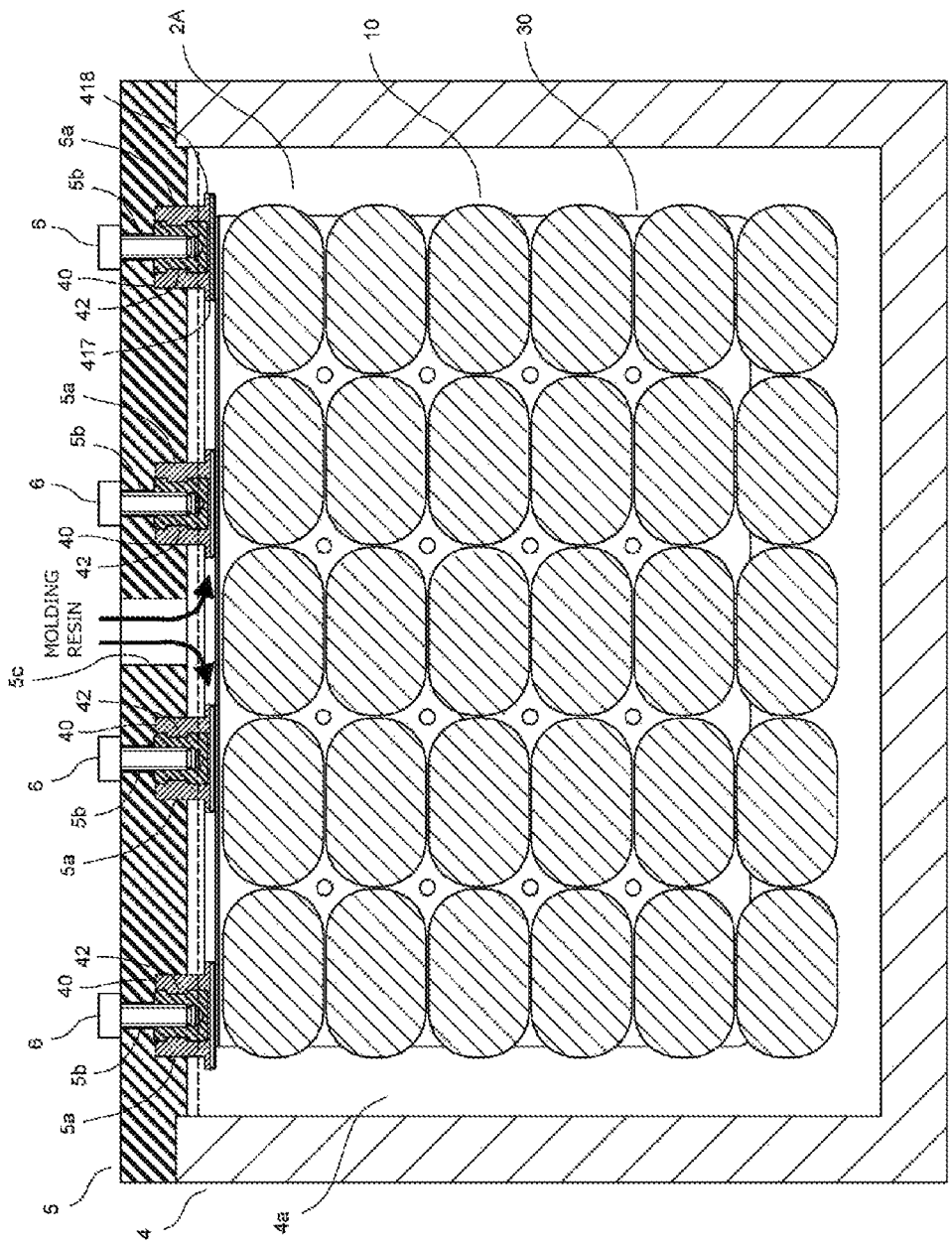

FILM CAPACITOR AND METHOD FOR MANUFACTURING FILM CAPACITOR

RELATED APPLICATIONS

This application is a continuation of the PCT International Application No. PCT/JP2016/004276 filed on Sep. 20, 2016, which claims the benefit of foreign priority of Japanese patent application No. 2015-200790 filed on Oct. 9, 2015, the contents all of which are incorporated herein by reference.

BACKGROUND

1. Technical Field

The present disclosure relates to a film capacitor, and a method for manufacturing the film capacitor.

2. Description of the Related Art

Unexamined Japanese Patent Publication No. 2014-216453 discloses a film capacitor having a casing-less structure in which an outer packaging resin covers a capacitor unit including a plurality of capacitor elements arranged horizontally and vertically, and a pair of externally-leading terminals (bus bars) connected to metal electrodes (end-face electrodes) formed on both end faces of each of the capacitor elements.

In the film capacitor disclosed in Unexamined Japanese Patent Publication No. 2014-216453, a hook-shaped connection terminal part to which an external terminal is to be connected is formed extending upward at an upper end of each of the externally-leading terminals, and the whole capacitor unit except the connection terminal part is covered by the outer packaging resin.

A mold and a holding jig are used for covering a capacitor unit with an outer packaging resin. The mold has an open top, and the holding jig is laid across the open top. The capacitor unit is hung from the holding jig with the connection terminal parts hooked onto the top face of the holding jig and then put into the mold. The connection terminal parts are fixed to the holding jig by bolts. A melted resin is injected into the mold and then hardened. The hardened resin becomes the outer packaging resin. The capacitor unit is removed together with the holding jig from the mold, and then the holding jig is removed from the capacitor unit. The above-described procedure completes the film capacitor including the capacitor unit covered by the outer packaging resin.

Since the capacitor unit is hung from the holding jig via the connection terminal parts, the connection terminal parts are likely to deform (refer to FIG. 15 in Unexamined Japanese Patent Publication No. 2014-216453), and further the capacitor unit is likely to be unstable at the hanging state. Thus, the capacitor unit may be put into the mold in an inclined state. This may cause to make the thickness of the outer packaging resin non-uniform, and thus functions of the outer packaging resin such as a moisture-proof property may not fully exhibit.

As for this problem, in the film capacitor disclosed in Unexamined Japanese Patent Publication No. 2014-216453, the capacitor unit is provided with a support member. The support member includes an extension portion, outer ends of which extend outward beyond both end faces of the capacitor unit. When the capacitor unit is put into the mold, the outer ends of the extension portion come into contact with inner side faces of the mold. This configuration prevents the capacitor unit from being inclined in the mold.

SUMMARY

A film capacitor according to a first aspect of the present disclosure includes a capacitor unit, and an outer packaging resin covering the capacitor unit. The capacitor unit includes a capacitor group, a first bus bar, a second bus bar, and a fixation portion. The capacitor group includes a plurality of capacitor elements. The first bus bar extracts electricity from the capacitor group. The second bus bar extracts electricity from the capacitor group, the second bus bar facing the first bus bar. The first bus bar and the second bus bar are fixed to the fixation portion. The first bus bar includes a connection terminal part formed at one end of the first bus bar, and the second bus bar includes a connection terminal part formed at one end of the second bus bar. Each of the connection terminal part of the first bus bar and the connection terminal part of the second bus bar is exposed from the outer packaging resin to be connected to an external terminal. At least one of the connection terminal part of the first bus bar and the connection terminal part of the second bus bar is coupled to the fixation portion.

A method for manufacturing a film capacitor according to a second aspect of the present disclosure includes the following steps. That is, a first step is assembling a capacitor unit that includes a capacitor group including a plurality of capacitor elements, a first bus bar and a second bus bar that extract electricity from the capacitor group, and a fixation portion. The first bus bar includes a connection terminal part formed at one end of the first bus bar, the second bus bar includes a connection terminal part formed at one end of the second bus bar, each of the connection terminal part of the first bus bar and the connection terminal part of the second bus bar being to be connected to an external terminal, and at least one of the connection terminal part of the first bus bar and the connection terminal part of the second bus bar is coupled to the fixation portion. A second step is fixing a holding jig to the fixation portion of the capacitor unit. A third step is putting the capacitor unit hung from the holding jig into an inner tank of a mold. A fourth step is injecting melted resin into the inner tank and hardening the melted resin. A fifth step is removing, from the mold and the holding jig, the capacitor unit that is covered by an outer packaging resin and has the connection terminal part of the first bus bar and the connection terminal part of the second bus bar each of which is exposed from the outer packaging resin, the outer packaging resin being obtained by hardening the melted resin.

According to the present disclosure, there can be provided a film capacitor and a method for manufacturing the film capacitor that prevent a deterioration in productivity and achieves suitable coverage with the outer packaging resin.

Effects or meanings of the present disclosure will be further clarified in the following description of the exemplary embodiments. However, the exemplary embodiments described below are merely examples of implementing the present disclosure, and the present disclosure is not at all limited to the examples described in the following exemplary embodiments.

BRIEF DESCRIPTION OF THE DRAWINGS

FIG. 5 is a front cross-sectional view illustrating the capacitor unit hung from a holding jig and put in a mold, according to the first exemplary embodiment;

DETAILED DESCRIPTION OF EMBODIMENT

Prior to describing exemplary embodiments of the present disclosure, problems in a conventional film capacitor are described. In the configuration disclosed in Unexamined Japanese Patent Publication No. 2014-216453, the size of the capacitor unit including the extension portion is almost identical to the size of the inside of the mold (that is, the extension portion causes to interfere with the smooth procedure in assembling process). Thus, the capacitor unit is unlikely to be smoothly put into the mold, and this may result in a deterioration in productivity of the film capacitor.

In view of the above-described circumstances, the present disclosure provides a film capacitor, and a method for manufacturing the film capacitor that prevent a deterioration in productivity and achieves suitable covering with the outer packaging resin.

Exemplary embodiments of the present disclosure will now be described with reference to the accompanying drawings. For the sake of convenience, directions including front and rear, left and right, and up and down are added to some of the drawings as appropriate.

First Exemplary Embodiment

First, a description will be given of film capacitor 1A of a first exemplary embodiment of the present disclosure. Film capacitor 1A of the present exemplary embodiment is used for hybrid vehicles, for example.

Figure 1:
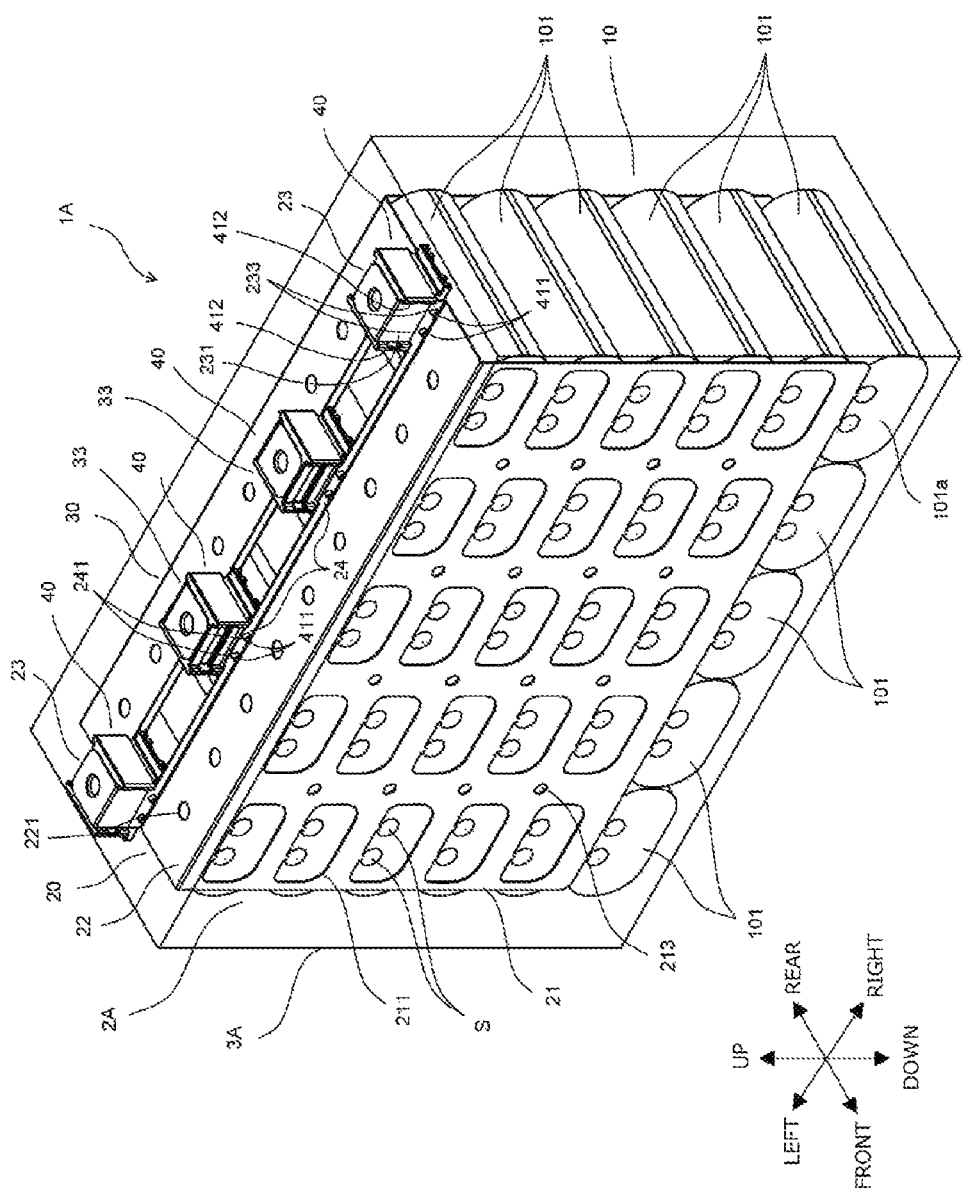
FIG. 1 is a top front perspective view illustrating a film capacitor according to a first exemplary embodiment.
Figure 2:
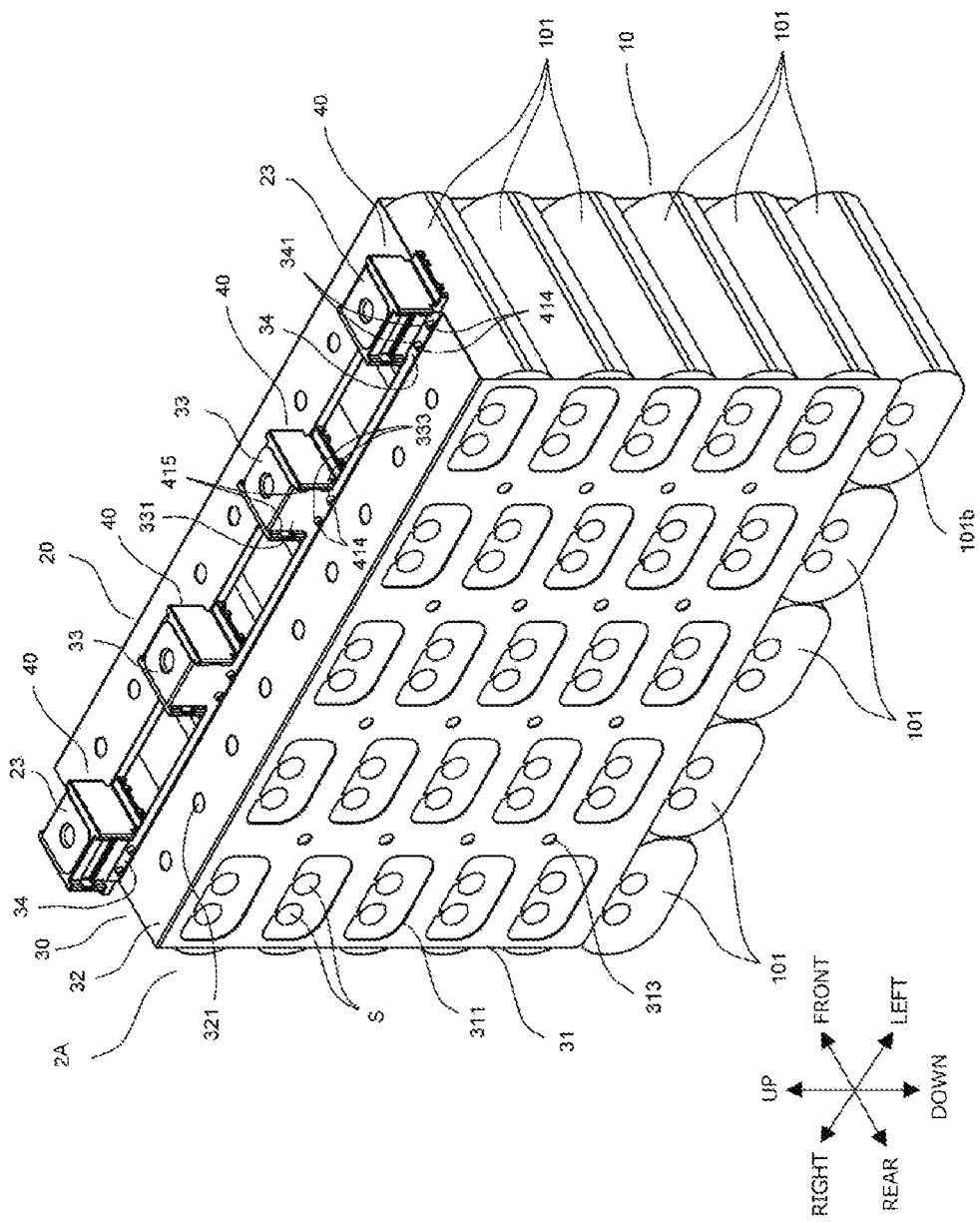
FIG. 2 is a top rear perspective view illustrating a capacitor unit according to the first exemplary embodiment.
Figure 3:
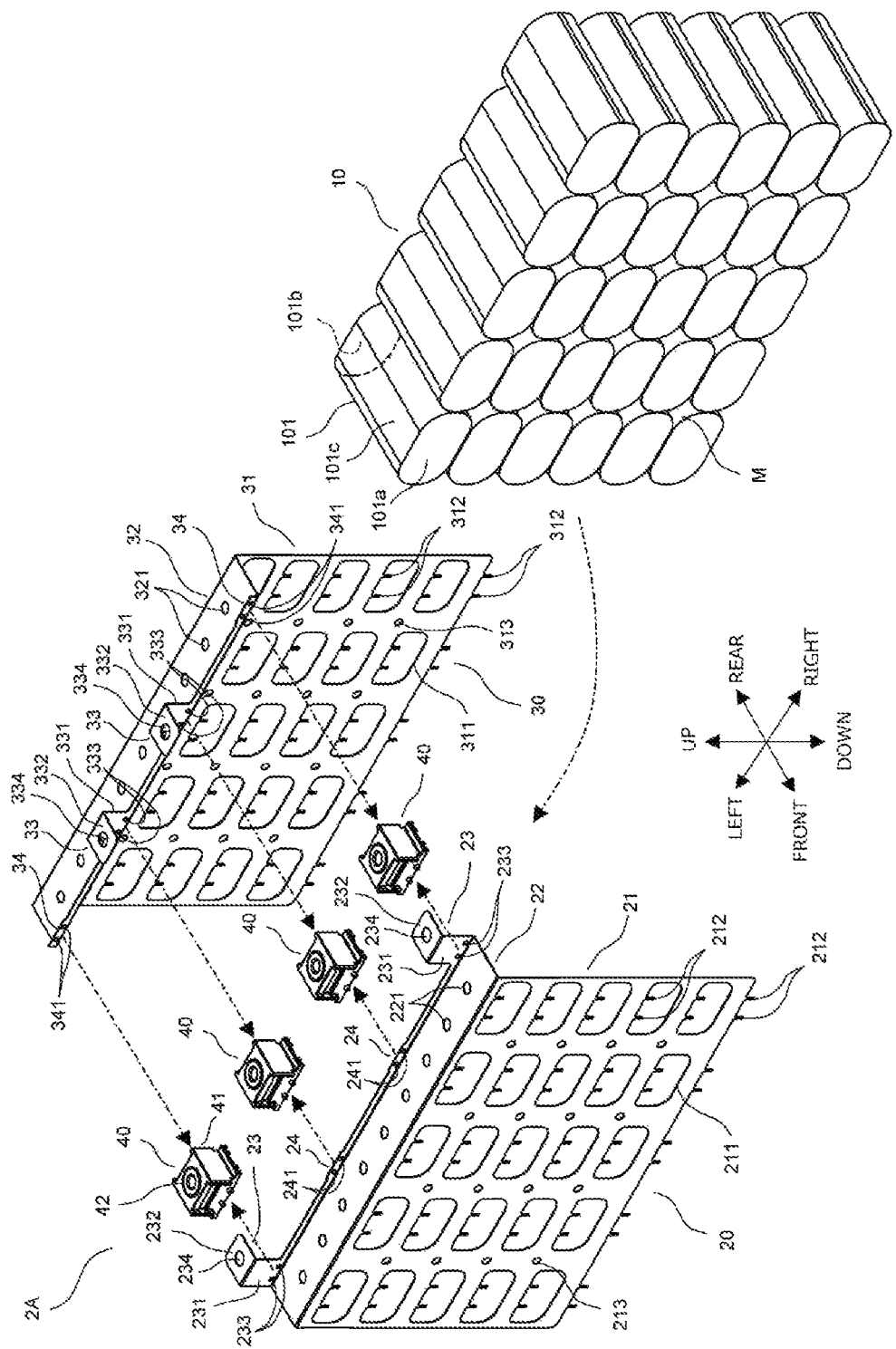
FIG. 3 is a top front exploded perspective view illustrating the capacitor unit according to the first exemplary embodiment.
Figure 4A:
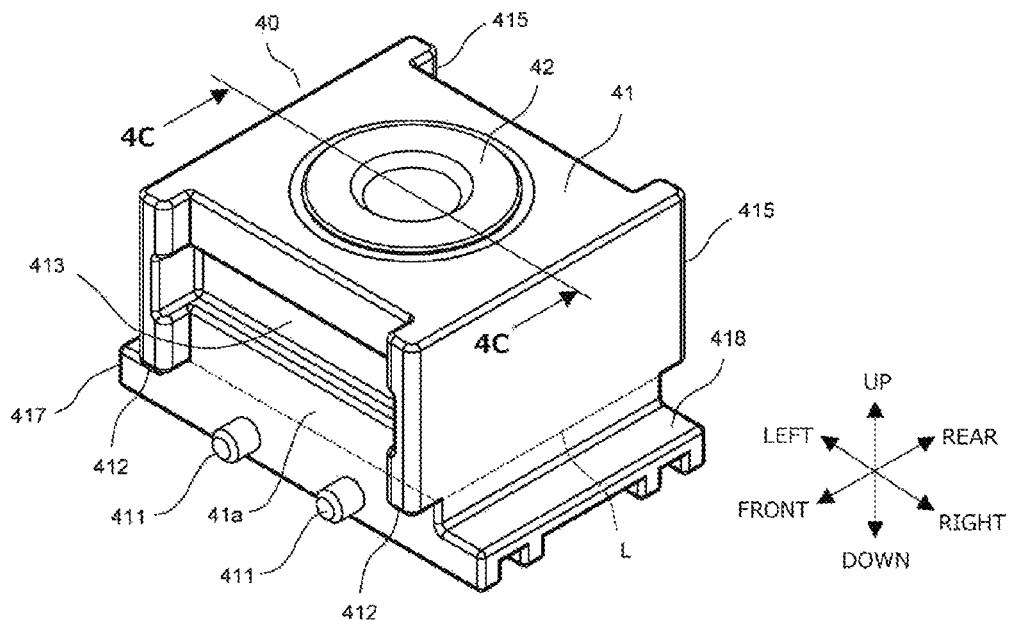
FIG. 4A is a top front perspective view illustrating a fixation portion according to the first exemplary embodiment.
Figure 4B:
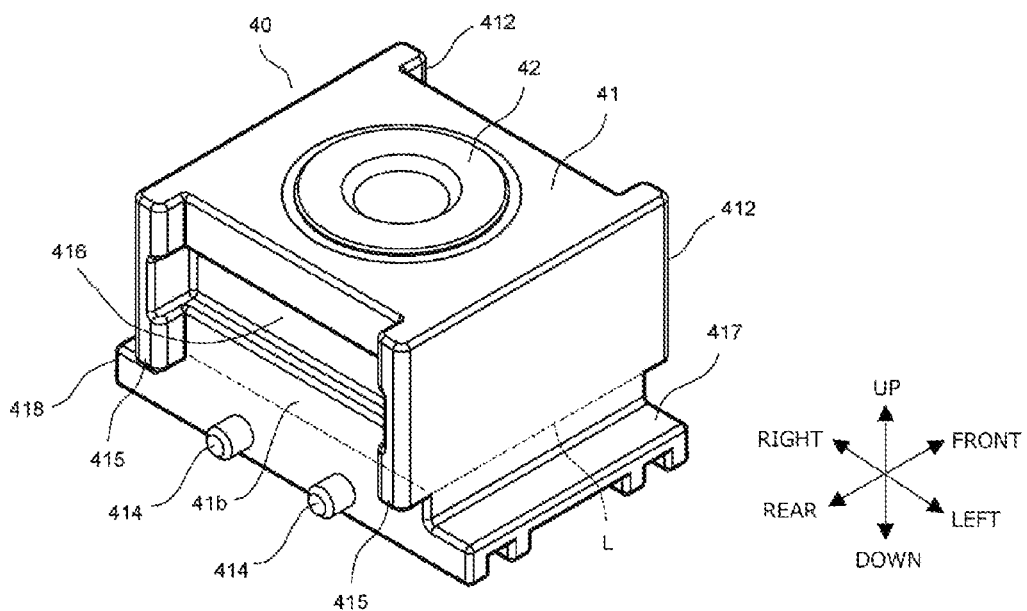
FIG. 4B is a top rear perspective view illustrating the fixation portion according to the first exemplary embodiment.
Figure 4C:
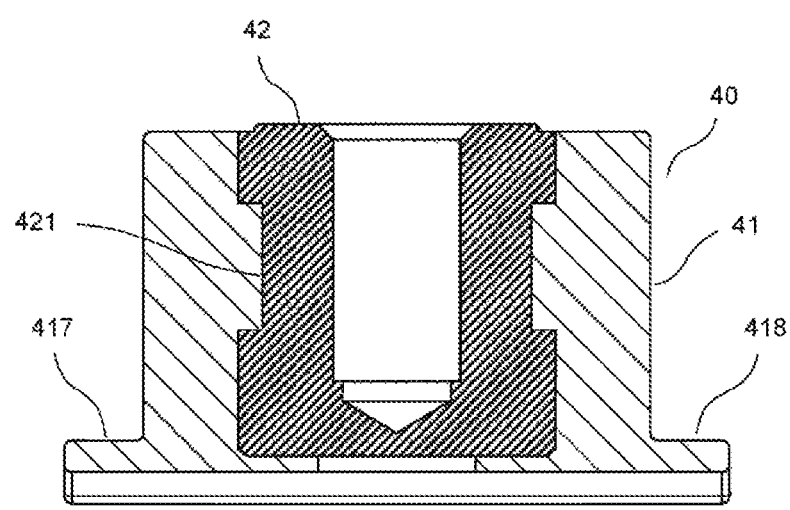
FIG. 4C is a cross-sectional view taken along line 4C-4C of FIG. 4A according to the first exemplary embodiment.

FIG. 1 is a top front perspective view illustrating film capacitor 1A. FIG. 2 is a top rear perspective view illustrating capacitor unit 2A. FIG. 3 is a top front exploded perspective view illustrating capacitor unit 2A. FIG. 4A is a top front perspective view illustrating fixation portion 40. FIG. 4B is a top rear perspective view illustrating fixation portion 40 FIG. 4C is a cross-sectional view taken along line 4C-4C of FIG. 4A. Note that, in FIG. 1, outer packaging resin 3A is depicted as a transparent resin. In FIG. 4A and FIG. 4B, a line L where a top face of outer packaging resin 3A is positioned is depicted with a long dashed short dashed line.

As illustrated in FIG. 1 to FIG. 3, film capacitor 1A includes capacitor unit 2A, and outer packaging resin 3A covering capacitor unit 2A. Capacitor unit 2A includes capacitor group 10, front bus bar 20, rear bus bar 30, and four fixation portions 40.

Capacitor group 10 includes a plurality of capacitor elements 101 arranged vertically and horizontally. In the present exemplary embodiment, capacitor group 10 includes a total of thirty capacitor elements 101 which are arranged in six rows (six capacitor elements 101 in a vertical direction) and five columns (five capacitor elements 101 in a horizontal direction). Each of capacitor elements 101 is formed as follows: stacking two metalized films that are dielectric films on which aluminum is deposited; winding or layering the stacked metalized films; and pressing the wound or layered body to make the body flat. End-face electrodes 101a, 101b are formed on respective end faces of each of capacitor elements 101. Capacitor elements 101 are arranged in such a manner that a direction normal to flat faces of capacitor elements 101 is the vertical direction. Note that although each of capacitor elements 101 of the present exemplary embodiment is formed of metalized films that are dielectric films on which aluminum is deposited, capacitor element 101 may be formed of metalized films having different metal such as zinc or magnesium deposited on the films. Alternatively, each of capacitor elements 101 may be formed of metalized films having some of the above-described metals disposed on the films or may be formed of metalized films having an alloy of the above-described metals disposed on the films.

Front bus bar 20 and rear bus bar 30 extract electricity from capacitor group 10. Front bus bar 20 is connected to end-face electrode 101a on a front side of each of capacitor elements 101, and rear bus bar 30 is connected to end-face electrode 101b on a rear side of each of capacitor elements 101.

Front bus bar 20 is made of a conductive material such as copper and includes first terminal plate 21, second terminal plate 22, two connection terminal plates 23, and two coupling parts 24. Front bus bar 20 is formed from a copper piece suitably cut out from a copper sheet and bent, indicating that first terminal plate 21, second terminal plate 22, two connection terminal plates 23, and two coupling parts 24 are integrally formed.

First terminal plate 21 has a horizontally long rectangular shape, covers end-face electrode 101a on the front side of each of capacitor elements 101, and is in contact with each of end-face electrodes 101a. First terminal plate 21 includes twenty five openings 211. Openings 211 correspond to respective capacitor elements 101 belonging to the first (uppermost) to fifth rows from the top. And each of openings 211 has a horizontally long rectangular shape. First terminal plate 21 includes pairs of electrode terminals 212 at a lower end of first terminal plate 21, and further includes at upper edges of each of openings 211. The pairs of electrode terminals 212 correspond to respective end-face electrodes 101a on the front side of capacitor elements 101. Thus, the number of the pairs of electrode terminals 212 is thirty, which is the number of capacitor elements 101. First terminal plate 21 still further includes sixteen first communication through-holes 213 that are round and correspond to respective gaps M between four capacitor elements 101 adjacent vertically and horizontally to each other.

Second terminal plate 22 extends rearward from an upper end of first terminal plate 21 and has a horizontally long and thin rectangular shape. Second terminal plate 22 covers peripheral face 101c of each of uppermost capacitor elements 101 at the front part. Second terminal plate 22 includes nine second communication through-holes 221 that are round and horizontally adjacent to each another.

Two connection terminal plates 23 are formed at a rear end of second terminal plate 22, the rear end corresponding to one end of front bus bar 20. One of two connection terminal plates 23 is formed at a left end of second terminal plate 22, and the other of two connection terminal plates 23 is formed at a right end of second terminal plate 22. Two connection terminal plates 23 each include first terminal part 231 and second terminal part 232. First terminal part 231 is flat and vertically extends from the rear end of second terminal plate 22. Second terminal part 232 is flat and extends rearward from and nearly perpendicular to first terminal part 231. At a lower part of first terminal part 231, a pair of round through-holes 233 are formed horizontally adjacent to each another. Second terminal part 232 includes insertion through-hole 234 that is round and corresponds to nut 42 of fixation portion 40.

Two coupling parts 24 are formed at the rear end of second terminal plate 22. One of two coupling parts 24 is formed on a right side slightly away from a center of second terminal plate 22, and the other of two coupling parts 24 is formed on a left side slightly away from the center. Each of two coupling parts 24 includes a pair of through-holes 241 that are round and horizontally adjacent to each other.

Rear bus bar 30 is formed of a conductive material such as copper and includes first terminal plate 31, second terminal plate 32, two connection terminal plates 33, and two coupling parts 34. Rear bus bar 30 is formed of a copper piece suitably cut out from a copper sheet and bent, indicating that first terminal plate 31, second terminal plate 32, two connection terminal plates 33, and two coupling parts 34 are integrally formed.

First terminal plate 31 has a horizontally long rectangular shape, covers end-face electrode 101b on the rear side of each of capacitor elements 101, and is in contact with each of end-face electrodes 101b. As with first terminal plate 21 of front bus bar 20, first terminal plate 31 includes twenty five openings 311, thirty pairs of electrode terminals 312, and sixteen first communication through-holes 313.

Second terminal plate 32 extends forward from an upper end of first terminal plate 31 and has a horizontally long and thin rectangular shape. Second terminal plate 32 covers peripheral face 101c of each of uppermost capacitor elements 101 at the rear part. Second terminal plate 32 includes nine second communication through-holes 321 that are round and horizontally adjacent to each other.

Two connection terminal plates 33 are formed at a front end of second terminal plate 32, the front end corresponding to one end of rear bus bar 30. One of two connection terminal plates 33 is formed on a right side slightly away from a center of second terminal plate 32, and the other of two connection terminal plates 33 is formed on a left side slightly away from the center. Two connection terminal plates 33 each include first terminal part 331 and second terminal part 332. First terminal part 331 is flat and vertically extends from the front end of second terminal plate 32. Second terminal part 332 is flat and extends forward from and nearly perpendicular to first terminal part 331. At a lower part of first terminal part 331, a pair of round through-holes 333 are formed. Second terminal part 332 includes insertion through-hole 334 that is round and corresponds to nut 42 of fixation portion 40.

Two coupling parts 34 are formed at the front end of second terminal plate 32. One of two coupling parts 34 is formed at a left end of second terminal plate 32, and the other of two coupling parts 34 is formed at a right end of second terminal plate 32. Each of two coupling parts 34 includes a pair of through-holes 341 that are round.

As illustrated in FIG. 4A to FIG. 4C, fixation portion 40, which is formed of resin, includes body 41 that has a substantially rectangular parallelepiped shape, and nut 42 integrally formed in body 41 by insert molding. At a lower part on a front face of body 41, a pair of cylindrical protrusions 411 are formed horizontally adjacent to each other. At a left end and a right end on the front face of body 41, ribs 412 are formed above protrusions 411. Ribs 412 extend vertically and protrude forward. A region between left and right ribs 412 on the front face of body 41 is contact face 41a that first terminal part 231 of connection terminal plate 23 of front bus bar 20 comes into contact with. Furthermore, on contact face 41a, groove portion 413 is formed extending in a direction (horizontal direction) intersecting to the vertical direction. The vertical direction corresponds to a direction in which connection terminal plate 23 is exposed from outer packaging resin 3A (that is, a direction in which a part of connection terminal plate 23 exposed from outer packaging resin 3A extends away from outer packaging resin 3A). Groove portion 413 is formed extending up to inside faces of left and right ribs 412.

Body 41 has a shape symmetrical in a front-to-back direction. As with front face of body 41, protrusions 414, ribs 415, contact face 41b, and groove portion 416 are formed on a rear face of body 41. Body 41 further includes left leg 417 and right leg 418. Left leg 417 protrudes leftward from a lower part on a left-side face of body 41, and right leg 418 protrudes rightward from a lower part on a right-side face of body 41.

As illustrated in FIG. 4C, nut 42 includes narrow portion 421 that is a portion of an outer peripheral face of nut 42 recessed inward. Narrow portion 421 prevents nut 42 from easily getting out of body 41 upward.

As for assemble of capacitor unit 2A, an assembly jig (not illustrated) is used, for example. In such a case, first, front bus bar 20 is placed into the assembly jig, and two connection terminal plate 23 and two coupling parts 24 of front bus bar 20 are coupled to the front faces of respective fixation portions 40. Next, in the assembly jig, capacitor group 10 is placed behind front bus bar 20. Then, rear bus bar 30 is placed behind capacitor group 10. At this time, two connection terminal plates 33 and two coupling parts 34 of rear bus bar 30 are coupled to the rear faces of respective fixation portions 40.

By using the assembly jig, front bus bar 20, rear bus bar 30, and capacitor group 10 are suitably positioned. Furthermore, four fixation portions 40 suitably defines a space between front bus bar 20 and rear bus bar 30.

After capacitor group 10, front bus bar 20, rear bus bar 30, and fixation portions 40 are placed in the assembly jig, each of the pairs of electrode terminals 212 of front bus bar 20 and end-face electrode 101a on the front side of each of capacitor elements 101 are soldered, and each of the pairs of electrode terminals 312 of rear bus bar 30 and end-face electrode 101b on the rear side of each of capacitor elements 101 are soldered. Solder S causes front bus bar 20, rear bus bar 30, and capacitor group 10 to be fixed. Then, capacitor unit 2A removed from the assembly jig, and capacitor unit 2A as illustrated in FIG. 2 is completed.

In completed capacitor unit 2A, the pair of protrusions 411 on the front face of each of two fixation portions 40, which are located at the left and right ends of capacitor unit 2A, are inserted into the pair of through-holes 233 of first terminal part 231 of front bus bar 20, respectively. And first terminal part 231 is fitted into a space between left and right ribs 412 on the front face of fixation portion 40 and is in contact with contact face 41a. Furthermore, the pair of protrusions 414 on the rear face of fixation portion 40, which are located at the left and right ends of capacitor unit 2A, are inserted into the pair of through-holes 341 of coupling part 34 of rear bus bar 30, respectively. This causes connection terminal plate 23 of front bus bar 20 and coupling part 34 of rear bus bar 30 to be securely fixed to fixation portion 40 such that connection terminal plate 23 and coupling part 34 do not move vertically and horizontally. Furthermore, second terminal part 232 of connection terminal plate 23 is positioned on the top face of fixation portion 40, causing insertion through-hole 234 to be aligned with a threaded hole of nut 42.

Likewise, the pair of protrusions 414 on the rear face of each of two fixation portions 40, which are adjacent to the center, are inserted into the pair of through-holes 333 of first terminal part 331 of rear bus bar 30, respectively. And first terminal part 331 is fitted into a space between left and right ribs 415 on the rear face of fixation portion 40 and is in contact with contact face 41b. Furthermore, the pair of protrusions 411 on the front face of fixation portion 40, which are adjacent to the center, are inserted into the pair of through-holes 241 of coupling part 24 of front bus bar 20, respectively. This causes connection terminal plate 33 of rear bus bar 30 and coupling part 24 of front bus bar 20 to be securely fixed to fixation portion 40 such that connection terminal plate 33 and coupling part 24 do not move vertically and horizontally. Furthermore, second terminal part 332 of connection terminal plate 33 is positioned on the top face of fixation portion 40, causing insertion through-hole 334 to be aligned with the threaded hole of nut 42.

In order to cover completed capacitor unit 2A with outer packaging resin 3A, mold 4 and holding jig 5 are used. Mold 4 is to be filled with melted molding resin. Holding jig 5 is for putting capacitor unit 2A hung from holding jig 5 into mold 4.

FIG. 5 is a front cross-sectional view illustrating capacitor unit 2A hung from holding jig 5 and put in mold 4.

Mold 4 includes inner tank 4a having an open top. A size of inner tank 4a is greater than a size of capacitor unit 2A by a thickness of outer packaging resin 3A. Holding jig 5 has a long and thin rectangular parallelepiped shape and has a length that is almost identical to the size of mold 4. On a bottom face of holding jig 5, four recessed portions 5a used for housing fixation portions 40 are formed, and insertion through-holes 5b extending from a top face of holding jig 5 to recessed portions 5a are formed, through which bolts 6 pass through. Furthermore, at a center of holding jig 5, injection port 5c for melted molding resin is formed.

Four fixation portions 40 are inserted into recessed portions 5a of holding jig 5, respectively. And bolts 6 are passed through insertion through-holes 5b from the top face of holding jig 5 and screwed into nuts 42 of fixation portions 40. This causes holding jig 5 to be fixed to the upper portion of capacitor unit 2A. Holding jig 5 is laid across the top face of mold 4, causing capacitor unit 2A hung from holding jig 5 to be put into inner tank 4a of mold 4.

After capacitor unit 2A is put into inner tank 4a of mold 4, melted molding resin is injected into inner tank 4a through injection port 5c of holding jig 5. As illustrated by a broken line in FIG. 5, inner tank 4a is filled with molding resin up to a level slightly above left and right legs 417, 418 of fixation portion 40. At this time, molding resin passes through second communication through-holes 221, 321 of second terminal plates 22, 32 of front bus bar 20 and rear bus bar 30 to spread into spaces between second terminal plates 22, 32 and capacitor group 10. Furthermore, molding resin passes through first communication through-holes 213, 313 of first terminal plates 21, 31 of front bus bar 20 and rear bus bar 30 to spread into gaps M between four adjacent capacitor elements 101 of capacitor group 10. Then, molding resin is cooled and hardened, which becomes outer packaging resin 3A. Capacitor unit 2A is removed from inner tank 4a of mold 4, and then holding jig 5 is removed from capacitor unit 2A.

As described above, film capacitor 1A, as illustrated in FIG. 1, including capacitor unit 2A covered by outer packaging resin 3A is manufactured through the following steps: a step of assembling capacitor unit 2A; a step of fixing holding jig 5 to fixation portions 40 of capacitor unit 2A; a step of putting capacitor unit 2A hung from holding jig 5 into inner tank 4a of mold 4; a step of injecting melted molding resin into inner tank 4a and hardening melted molding resin; and a step of removing, from mold 4 and holding jig 5, capacitor unit 2A covered by outer packaging resin 3A obtained by hardening the melted molding resin. In film capacitor 1A, two connection terminal plates 23 of front bus bar 20 and two connection terminal plates 33 of rear bus bar 30 are exposed upward from outer packaging resin 3A. And second terminal parts 232, 332 of four connection terminal plates 23, 33 thus exposed are electrically connected to external terminals of an external electronic device.

As illustrated in FIG. 4A and FIG. 4B, it is noted that line L corresponding to the top face of outer packaging resin 3A covering capacitor unit 2A is positioned above left and right legs 417, 418 of fixation portion 40 and below groove portions 413, 416 of fixation portion 40. Therefore, left and right legs 417, 418 of fixation portion 40 are entirely covered by outer packaging resin 3A, and groove portions 413, 416 of fixation portion 40 are exposed from outer packaging resin 3A.

Effects of First Exemplary Embodiment

As described above, in accordance with the first exemplary embodiment, the following effects are exhibited.

In capacitor unit 2A, since two fixation portions 40 to which two connection terminal plates 23 of front bus bar 20 and two coupling parts 24 of rear bus bar 30 are coupled, and two fixation portions 40 to which two connection terminal plates 33 of rear bus bar 30 and two coupling parts 24 of front bus bar 20 are coupled can be fixed to holding jig 5, joints to holding jig 5 (fixation portions 40, connection terminal plates 23, 33, coupling parts 24, 34) can have sufficient strength. This makes the joints to holding jig 5 less susceptible to deformation or shaking, thus preventing capacitor unit 2A from being put into inner tank 4a of mold 4 in an inclined state. Therefore, capacitor unit 2A can be suitably covered by outer packaging resin 3A.

Furthermore, since first terminal parts 231, 331 of connection terminal plates 23, 33 are in contact with contact faces 41a, 41b of fixation portions 40, respectively, connection terminal plates 23, 33 can be firmly supported by contact faces 41a, 41b, enabling the joints to holding jig 5 to have further strength.

Furthermore, since pairs of protrusions 411, 414 of fixation portions 40 are configured to be inserted into through-holes 233, 333 of first terminal parts 231, 331 of connection terminal plates 23, 33, respectively, connection terminal plates 23, 33 can be securely fixed to fixation portions 40 such that connection terminal plates 23, 33 do not move vertically and horizontally.

Furthermore, since first terminal part 331 is configured to fit into the space between left and right ribs 412, 415 of fixation portions 40, connection terminal plates 23, 33 can be further securely fixed to fixation portions 40 such that connection terminal plates 23, 33 do not move horizontally.

Furthermore, in a case where film capacitor 1A is used in situations where film capacitor 1A is susceptible to vibrations or shocks, such as a situation in hybrid vehicles, such vibrations or shocks may cause a force in a direction in which fixation portions 40 gets out of outer packaging resin 3A, which is an upward force, to act on fixation portions 40. However, even in a case where such a force is generated, left and right legs 417, 418 of fixation portions 40 resists the force in outer packaging resin 3A, preventing the fixation portions 40 from moving upward. This prevents fixation portions 40 from being separated from outer packaging resin 3A, and thus prevents connection terminal plates 23, 33 from being damaged or the like.

Furthermore, since first terminal parts 231, 331 of connection terminal plates 23, 33 are in contact with contact faces 41a, 41b of fixation portions 40, respectively, melted molding resin may crawl up between first terminal parts 231, 331 and contact faces 41a, 41b by the capillary action during molding of outer packaging resin 3A. However, since groove portions 413, 416 are formed on contact faces 41a, 41b, between first terminal parts 231, 331 and contact faces 41a, 41b, gaps, which prevent the capillary action, are generated between first terminal parts 231, 331 and contact faces 41a, 41b, and thus crawling up of molding resin can be prevented. Furthermore, molding resin may also crawl up by the capillary action between both sides of each of first terminal parts 231, 331 and inner sides of left and right ribs 412, 415. However, crawling up of molding resin between first terminal parts 231, 331 and ribs 412, 415 can be prevented because groove portions 413, 416 extend up to the inner sides of left and right ribs 412, 415. This prevents molding resin from reaching second terminal parts 232, 332, and thus prevents contact failure or the like due to molding resin from occurring between second terminal parts 232, 332 and external terminals.

Second Exemplary Embodiment

Next, a description will be given of film capacitor 1B of a second exemplary embodiment of the present disclosure. Film capacitor 1B of the present exemplary embodiment includes a larger number of capacitor elements 101 than film capacitor 1A of the first exemplary embodiment, and thus, film capacitor 1B has greater electric capacitance (electrostatic capacity) than film capacitor 1A. Film capacitor 1B of present exemplary embodiment is used for railway vehicles, for example.

Figure 6:
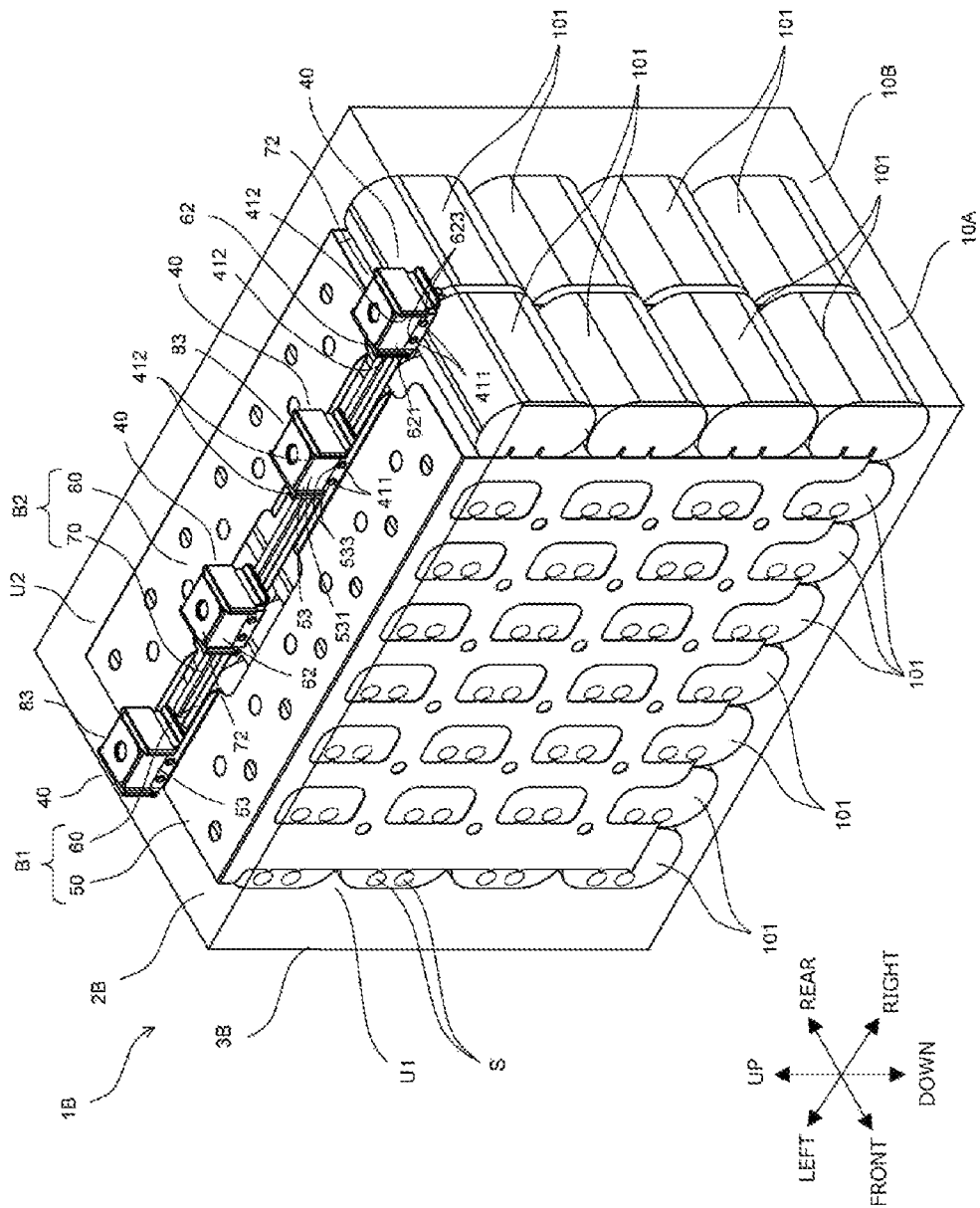
FIG. 6 is a top front perspective view illustrating a film capacitor according to a second exemplary embodiment.
Figure 7:
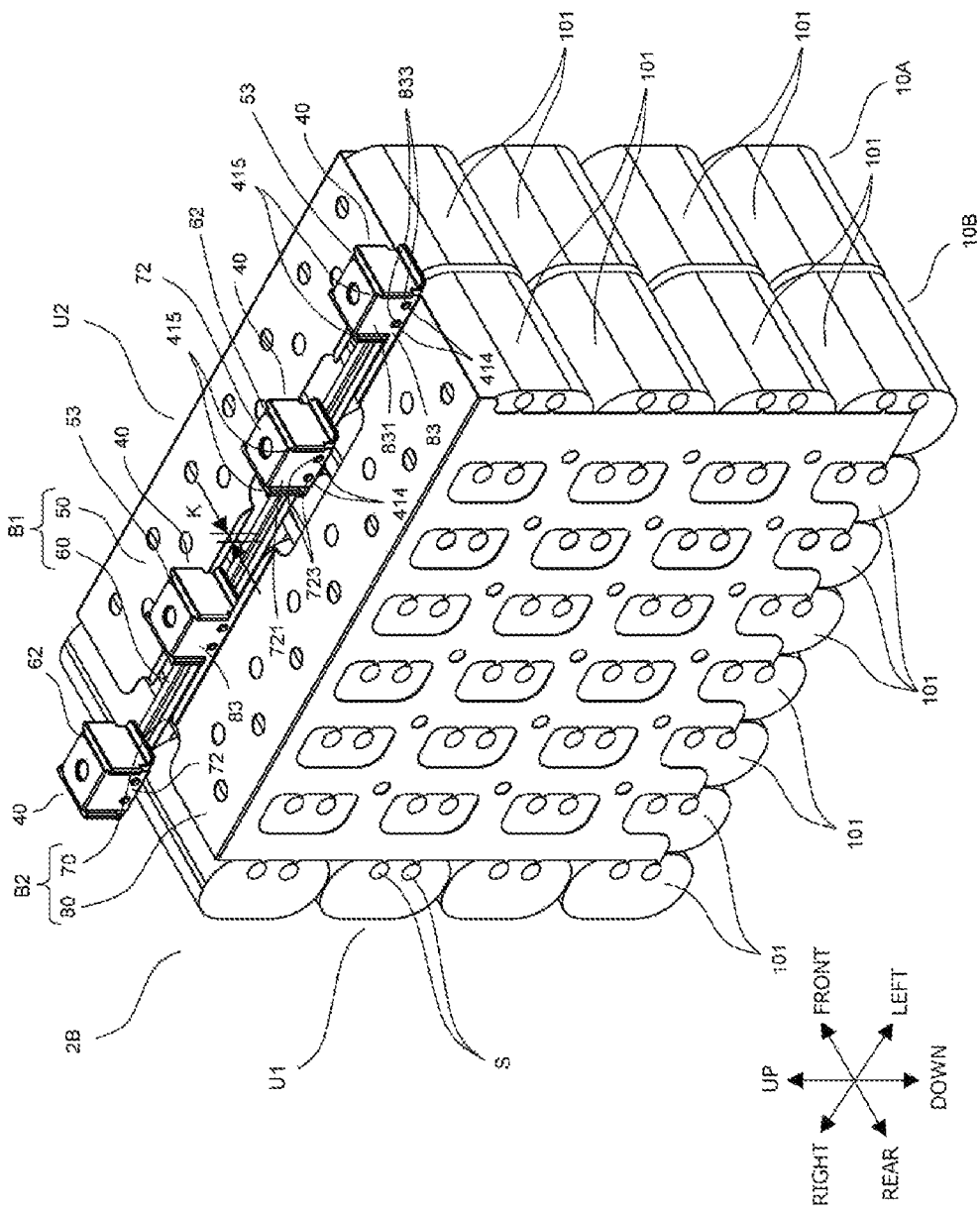
FIG. 7 is a top rear perspective view illustrating a capacitor unit according to the second exemplary embodiment.
Figure 8:
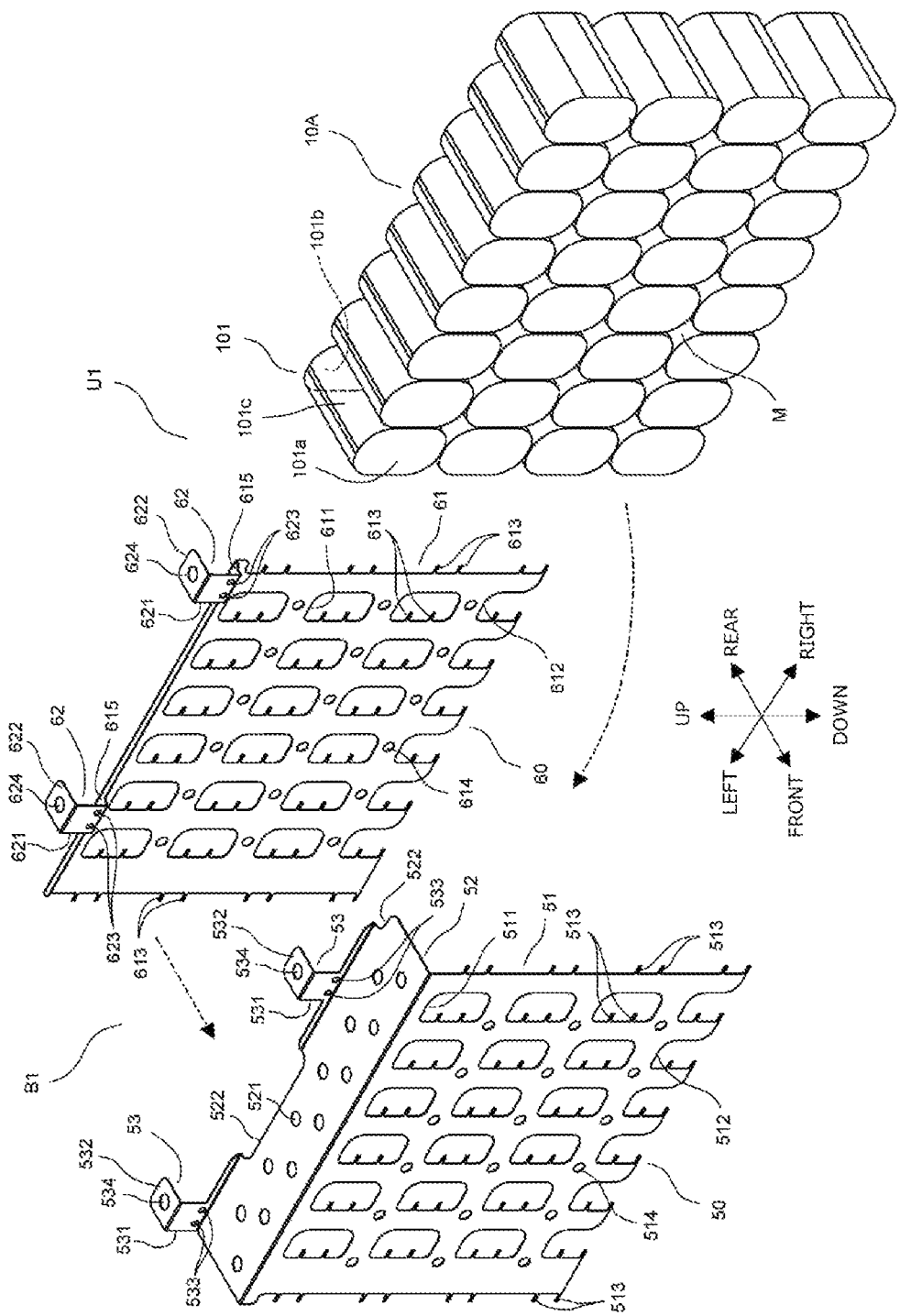
FIG. 8 is a top front exploded perspective view illustrating a first unit according to the second exemplary embodiment.
Figure 9:
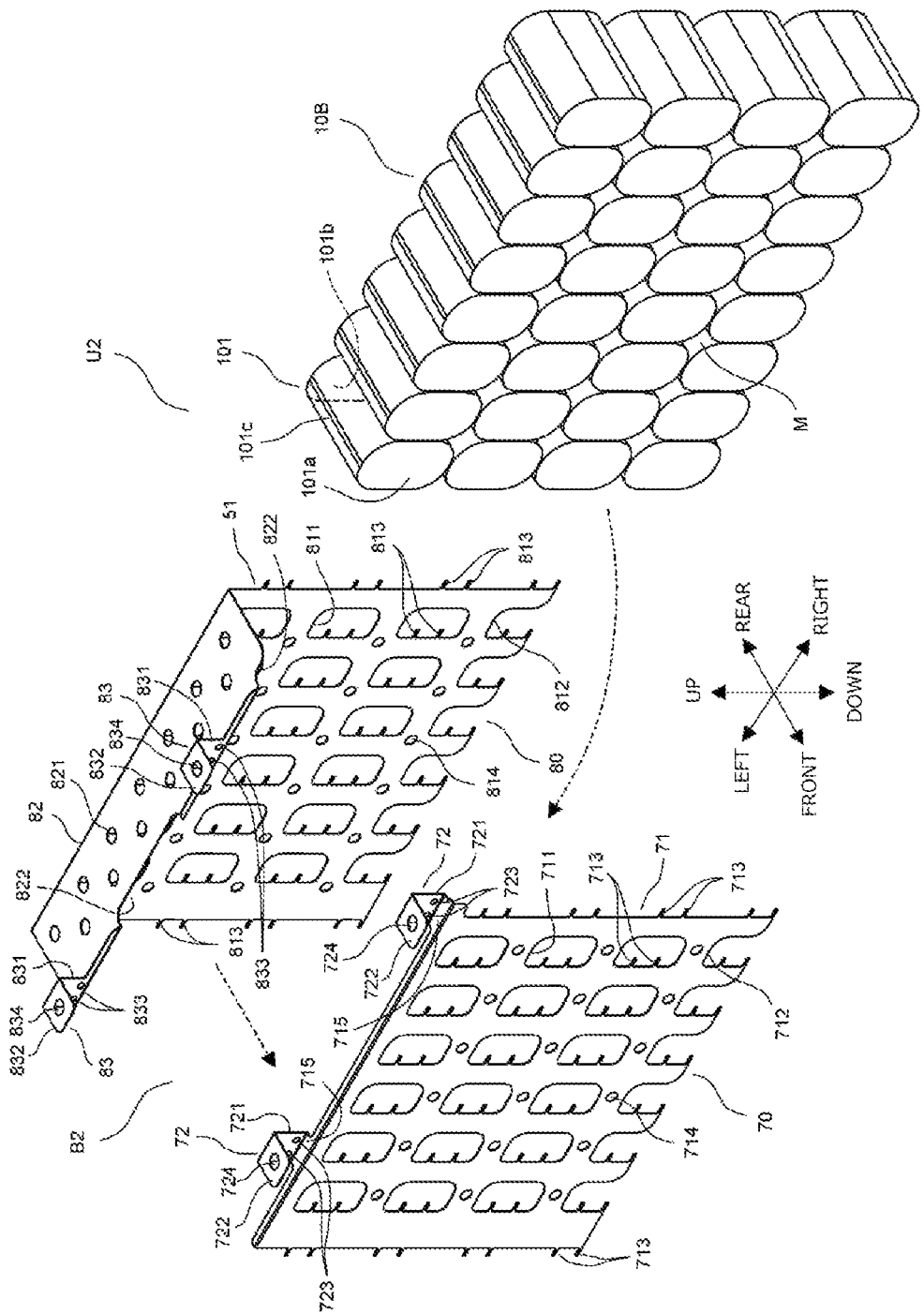
FIG. 9 is a top front exploded perspective view illustrating a second unit according to the second exemplary embodiment.
Figure 10:
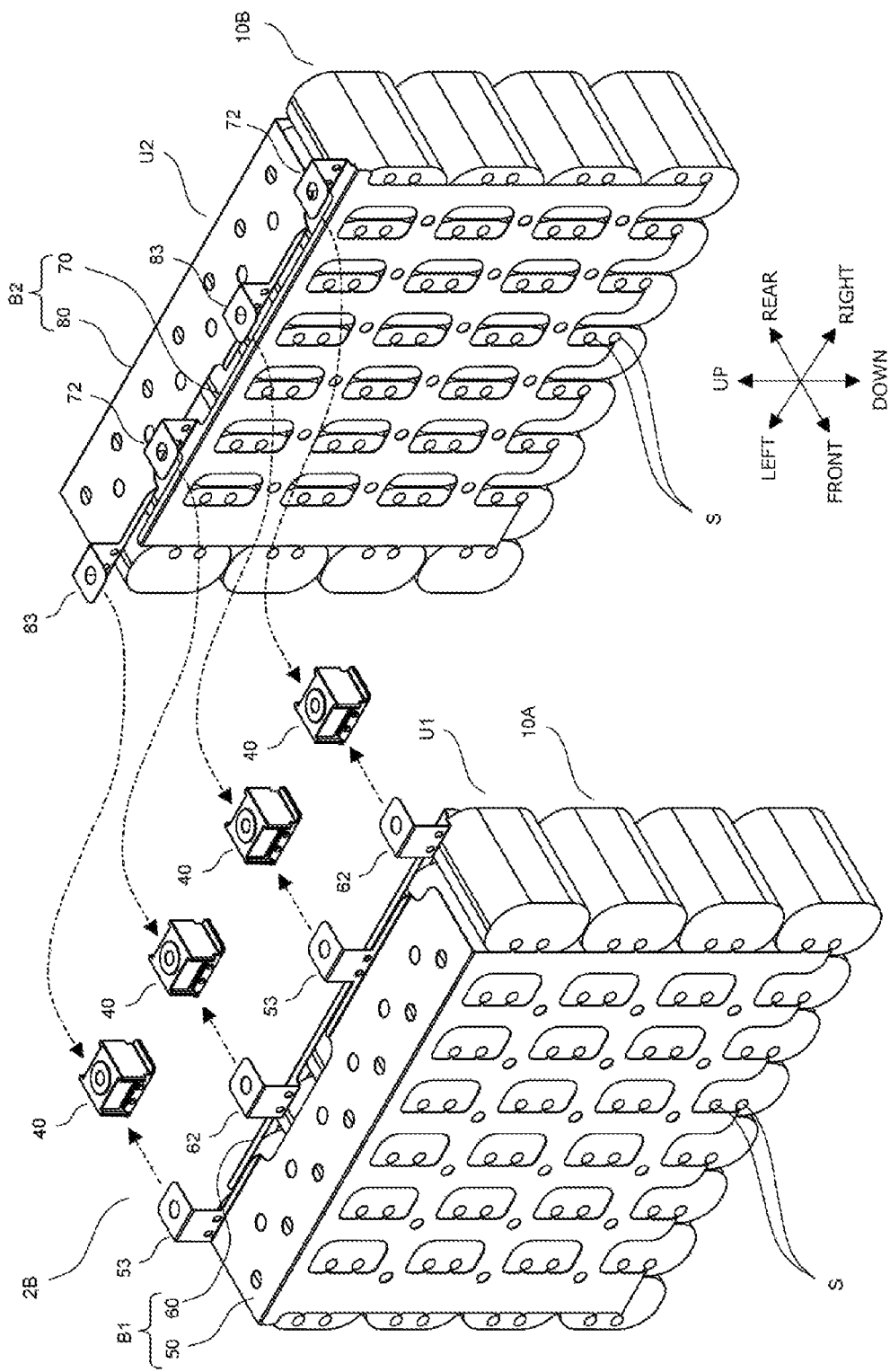
FIG. 10 is a perspective view illustrating the first and second units before being coupled to fixation portions according to the second exemplary embodiment.

FIG. 6 is a top front perspective view illustrating film capacitor 1B. FIG. 7 is a top rear perspective view illustrating capacitor unit 2B. FIG. 8 is a top front exploded perspective view illustrating first unit U1. FIG. 9 is a top front exploded perspective view illustrating second unit U2. FIG. 10 is a perspective view illustrating first unit U1 and second unit U2 before being coupled to fixation portions 40.

As illustrated in FIG. 6 to FIG. 10, film capacitor 1B includes capacitor unit 2B, and outer packaging resin 3B covering capacitor unit 2B. Capacitor unit 2B includes first unit U1, second unit U2, and fixation portions 40. First unit U1 is disposed on a front side of capacitor unit 2B, second unit U2 is disposed on a rear side of capacitor unit 2B, and fixation portions 40, which is identical to fixation portions 40 of the first exemplary embodiment, couple first unit U1 and second unit U2.

As illustrated in FIG. 8, first unit U1 includes first capacitor group 10A, and first bus bar B1 including first front bus bar 50 and first rear bus bar 60.

First capacitor group 10A includes a plurality of capacitor elements 101 arranged horizontally and vertically. Capacitor elements 101 are the same as capacitor elements 101 of the first exemplary embodiment. In the present exemplary embodiment, first capacitor group 10A includes a total of thirty two capacitor elements 101 arranged in four rows and eight columns Capacitor elements 101 are arranged in such a manner that a direction normal to flat faces of capacitor elements 101 is the horizontal direction.

First front bus bar 50 and first rear bus bar 60 extract electricity from first capacitor group 10A. First front bus bar 50 is connected to end-face electrode 101a on the front side of each of capacitor elements 101, and first rear bus bar 60 is connected to end-face electrode 101b on the rear side of each of capacitor elements 101.

First front bus bar 50 is made of a conductive material such as copper and includes first terminal plate 51, second terminal plate 52, and two connection terminal plates 53. First front bus bar 50 is formed from a copper piece suitably cut out from a copper sheet and bent, indicating that first terminal plate 51, second terminal plate 52, and two connection terminal plates 53 are integrally formed.

First terminal plate 51 has a horizontally long rectangular shape, covers end-face electrode 101a on the front side of each of capacitor elements 101, and is in contact with each of end-face electrodes 101a. First terminal plate 51 includes eighteen first openings 511, and six second openings 512. First openings 511 correspond to respective capacitor elements 101 that belong to the first to third rows from the top, but do not belong to the first column and the eighth column. And each of first openings 511 has a horizontally long rectangular shape. Second openings 512 correspond to respective capacitor elements 101 that belong to the fourth (lowermost) row from the top, but do not belong to the first column and the eighth column. And each of second openings 512 has a horizontally long rectangular shape, and extends up to a lower end of first terminal plate 51. First terminal plate 51 includes pairs of electrode terminals 513 at left and right edges of first terminal plate 51, and further includes at left edges of each of first openings 511 and each of the second openings 512. The pairs of electrode terminals 513 correspond to respective end-face electrodes 101a on the front side of capacitor elements 101. Thus, the number of the pairs of electrode terminals 513 is thirty two. First terminal plate 51 still further includes eighteen first communication through-holes 514 that are round and correspond to respective gaps M between four capacitor elements 101 vertically and horizontally adjacent to each other.

Second terminal plate 52 extends rearward from an upper end of first terminal plate 51 and has a horizontally long and thin rectangular shape. Second terminal plate 52 covers almost entire peripheral face 101c of each of uppermost capacitor elements 101. Second terminal plate 52 includes thirteen second communication through-holes 521 that are round and arranged in two lines in the front-to-back direction. At a right end and at a position on a left side slightly away from a center on a rear end of second terminal plate 52, notches 522 are formed to secure a distance to connection terminal plates 62 of first rear bus bar 60.

Two connection terminal plates 53 are formed at a rear end of second terminal plate 52, the rear end corresponding to one end of first bus bar B1. One of two connection terminal plates 53 is formed at the left end of second terminal plate 52, and the other of two connection terminal plates 53 is formed at a position between the right end and the center of second terminal plate 52. Two connection terminal plates 53 each include first terminal part 531 and second terminal part 532. First terminal part 531 is flat and vertically extends from the rear end of second terminal plate 52. Second terminal part 532 is flat and extends rearward from and nearly perpendicular to first terminal part 531. At a lower part of first terminal part 531, a pair of round through-holes 533 are formed horizontally adjacent to each other. Second terminal part 532 includes insertion through-hole 534 that is round and corresponds to nut 42 of fixation portion 40.

First rear bus bar 60 is made of a conductive material such as copper and includes terminal plate 61, and two connection terminal plates 62. First rear bus bar 60 is formed from a copper piece suitably cut out from a copper sheet and bent, indicating that terminal plate 61 and two connection terminal plates 62 are integrally formed.

Terminal plate 61 has a horizontally long rectangular shape, covers end-face electrode 101b on the rear side of each of capacitor elements 101, and is in contact with each of end-face electrodes 101b. As with first terminal plate 51 of first front bus bar 50, terminal plate 61 includes eighteen first openings 611, six second openings 612, thirty two pairs of electrode terminals 613, and eighteen first communication through-holes 614. Furthermore, at a right end and at a position between a left end and a center on an upper end of terminal plate 61, two connection parts 615 are formed slightly extending forward.

Two connection terminal plates 62 are formed to connect to front ends of two respective connection parts 615 on one end of first bus bar B1. As with connection terminal plate 53 of first front bus bar 50, two connection terminal plates 62 each include first terminal part 621 and second terminal part 622. At a lower part of first terminal part 621, a pair of round through-holes 623 are formed, and second terminal part 622 includes insertion through-hole 624 that is round and corresponds to nut 42 of fixation portion 40.

As illustrated in FIG. 9, second unit U2 includes second capacitor group 10B, and second bus bar B2 including second front bus bar 70 and second rear bus bar 80.

The configuration of second capacitor group 10B is identical to the configuration of first capacitor group 10A. It should be noted that a front and rear orientation of each of capacitor elements 101 of second capacitor group 10B is opposite to the orientation of each of capacitor elements 101 of first capacitor group 10A. This configuration causes a polarity of end-face electrode 101a on the front side of each of capacitor elements 101 of second capacitor group 10B to be identical to a polarity of end-face electrode 101b on the rear side of each of capacitor elements 101 of first capacitor group 10A. And this also causes a polarity of end-face electrode 101b on the rear side of each of capacitor elements 101 of second capacitor group 10B to be identical to a polarity of end-face electrode 101a on the front side of each of capacitor elements 101 of first capacitor group 10A.

Second front bus bar 70 and second rear bus bar 80 extract electricity from second capacitor group 10B. Second front bus bar 70 is connected to end-face electrode 101a on the front side of each of capacitor elements 101, and second rear bus bar 80 is connected to end-face electrode 101b on the rear side of each of capacitor elements 101.

Second front bus bar 70, which is made of a conductive material such as copper, has a shape symmetrical in the front-to-back direction with first rear bus bar 60, and includes terminal plate 71, and two connection terminal plates 72. Second front bus bar 70 is formed from a copper piece suitably cut out from a copper sheet and bent, indicating that terminal plate 71 and two connection terminal plates 72 are integrally formed.

Terminal plate 71 has a horizontally long rectangular shape, covers end-face electrode 101a on the front side of each of capacitor elements 101, and is in contact with each of end-face electrodes 101a. As with terminal plate 61 of first rear bus bar 60, terminal plate 71 includes eighteen first openings 711, six second openings 712, thirty two pairs of electrode terminals 713, and eighteen first communication through-holes 714. Furthermore, at a right end and at a position between a left end and a center on an upper end of terminal plate 71, two connection parts 715 are formed slightly extending rearward.

Two connection terminal plates 72 are formed to connect to front ends of two respective connection parts 715 on one end of second bus bar B2. Two connection terminal plates 72 each include first terminal part 721 and second terminal part 722. First terminal part 721 is flat and vertically extends from the front end of connection part 715. Second terminal part 722 is flat and extends forward from and nearly perpendicular to first terminal part 721. At a lower part of first terminal part 721, a pair of round through-holes 723 are formed, and second terminal part 722 includes insertion through-hole 724 that is round and corresponds to nut 42 of fixation portion 40.

Second rear bus bar 80, which is made of a conductive material such as copper, has a shape symmetrical in the front-to-back direction with first front bus bar 50, and includes first terminal plate 81, second terminal plate 82, and two connection terminal plates 83. Second rear bus bar 80 is formed from a copper piece suitably cut out from a copper sheet and bent, indicating that first terminal plate 81, second terminal plate 82, and two connection terminal plates 83 are integrally formed.

First terminal plate 81 has a horizontally long rectangular shape, covers end-face electrode 101b on the rear side of each of capacitor elements 101, and is in contact with each of end-face electrodes 101b. As with first terminal plate 51 of first front bus bar 50, first terminal plate 81 includes eighteen first openings 811, six second openings 812, thirty two pairs of electrode terminals 813, and eighteen first communication through-holes 814.

Second terminal plate 82 extends forward from an upper end of first terminal plate 81 and has a horizontally long and thin rectangular shape. Second terminal plate 82 covers almost entire peripheral face 101c of each of uppermost capacitor elements 101. As with second terminal plate 52 of first front bus bar 50, second terminal plate 82 includes thirteen round second communication through-holes 821, and two notches 822.

Two connection terminal plates 83 are formed at a front end of second terminal plate 82, the front end corresponding to one end of second bus bar B2. One of two connection terminal plates 83 is formed at the left end of second terminal plate 82, and the other of two connection terminal plates 83 is formed at a position between the right end and the center of second terminal plate 82. As with connection terminal plate 72 of second front bus bar 70, two connection terminal plates 83 each include first terminal part 831 and second terminal part 832. At a lower part of first terminal part 831, a pair of round through-holes 833 are formed, and second terminal part 832 includes insertion through-hole 834 that is round and corresponds to nut 42 of fixation portion 40.

As for assemble of first unit U1, an assembly jig (not illustrated) is used, for example. In such a case, first, first front bus bar 50 is placed into the assembly jig, and first capacitor group 10A is placed behind first front bus bar 50. Furthermore, first rear bus bar 60 is placed behind first capacitor group 10A. In the assembly jig, front bus bar 20, rear bus bar 30, and first capacitor group 10A are suitably positioned.

After first capacitor group 10A, first front bus bar 50, and first rear bus bar 60 are placed in the assembly jig, each pair of electrode terminals 513 of first front bus bar 50 and end-face electrode 101a on the front side of each of capacitor elements 101 are soldered, and each pair of electrode terminals 613 of first rear bus bar 60 and end-face electrode 101b on the rear side of each of capacitor elements 101 are soldered. Solder S causes first front bus bar 50, first rear bus bar 60, and first capacitor group 10A to be fixed. Then, first unit U1 removed from the assembly jig, and first unit U1 as illustrated in FIG. 10 is completed. In first unit U1, a position of connection terminal plate 53 of first front bus bar 50 is almost identical, in the front-to-back direction, to a position of two connection terminal plates 62 of first rear bus bar 60. Furthermore, four connection terminal plates 53, 62 are almost equally spaced in the horizontal direction.

As with first unit U1, second unit U2 is assembled, with the assembly jig, into a completed body as illustrated in FIG. 10. In second unit U2, a position of connection terminal plate 72 of second front bus bar 70 is almost identical, in the front-to-back direction, to a position of two connection terminal plates 83 of second rear bus bar 80. Furthermore, four connection terminal plates 72, 83 are almost equally spaced in the horizontal direction.

As illustrated in FIG. 10, four connection terminal plates 53, 62 of first unit U1 are coupled to front sides of four respective fixation portions 40. At this time, in leftmost fixation portion 40 and third fixation portion 40 from the left, the protrusions 411 on the front face of each of fixation portions 40 are inserted into through-holes 533 of first terminal part 531 of first front bus bar 50, respectively. And first terminal part 531 is fitted into a space between left and right ribs 412 on the front face of fixation portion 40 and is in contact with contact face 41a. Furthermore, in second fixation portion 40 from the left and rightmost fixation portion 40, the protrusions 411 on the front face of each of fixation portions 40 are inserted into through-holes 623 of first terminal part 621 of first rear bus bar 60, respectively. And first terminal part 621 is fitted into a space between left and right ribs 412 on the front face of fixation portion 40 and is in contact with contact face 41a. This causes four connection terminal plates 53, 62 of first bus bar B1 to be securely fixed to fixation portions 40 such that connection terminal plates 53, 62 do not move vertically and horizontally. Furthermore, second terminal parts 532, 622 of connection terminal plates 53, 62 are positioned on the top faces of respective fixation portions 40, causing insertion through-holes 534, 624 to be aligned with threaded through-holes of nuts 42.

Next, four connection terminal plates 72, 83 of second unit U2 are coupled to rear sides of four respective fixation portions 40. At this time, in leftmost fixation portion 40 and third fixation portion 40 from the left, the protrusions 414 on the rear face of each of fixation portions 40 are inserted into through-holes 833 of first terminal part 831 of second rear bus bar 80, respectively. And first terminal part 831 is fitted into a space between left and right ribs 415 on the rear face of fixation portion 40 and is in contact with contact face 41b. Furthermore, in second fixation portion 40 from the left and rightmost fixation portion 40, the protrusions 414 on the rear face of each of fixation portions 40 are inserted into through-holes 723 of first terminal part 721 of second front bus bar 70, respectively. And first terminal part 721 is fitted into a space between left and right ribs 415 on the rear face of fixation portion 40 and is into contact with contact face 41b. This causes four connection terminal plates 72, 83 of second bus bar B2 to be securely fixed to fixation portions 40 such that connection terminal plates 72, 83 do not move vertically and horizontally. Furthermore, second terminal parts 722, 832 of connection terminal plates 72, 83 are positioned on second terminal parts 532, 622 of connection terminal plate 53, 62 placed on the top faces of respective fixation portions 40. Thus, insertion through-holes 724, 834 of second terminal parts 722, 832 and insertion through-holes 534, 624 of connection terminal plates 53, 62 are aligned with threaded holes of nuts 42.

As described above, first unit U1 and second unit U2 are coupled to four fixation portions 40, and then the assembly of capacitor unit 2B is completed as illustrated in FIG. 7. Note that, in a situation that first unit U1 and second unit U2 are coupled to fixation portions 40, first rear bus bar 60 and second front bus bar 70 are not in contact with each other, and a predetermined gap K is provided between first rear bus bar 60 and second front bus bar 70.

Completed capacitor unit 2B is hung from and fixed to holding jig 5 that is identical to holding jig 5 of the above described first exemplary embodiment. And capacitor unit 2B is placed into mold 4 that is similar to mold 4 of the first exemplary embodiment. A size of capacitor unit 2B is greater than that of capacitor unit 2A of the first exemplary embodiment. Thus, for mold for capacitor unit 2B, the size of the inner tank in the front-back direction is greater than the size of inner tank 4a of mold 4 in the front-back direction.

Melted molding resin is injected into the inner tank of the mold in which capacitor unit 2B is placed. At this time, molding resin passes through second communication through-holes 521 of second terminal plate 52 of first front bus bar 50 to spread into spaces between second terminal plates 52 and first capacitor group 10A. Furthermore, molding resin passes through first communication through-holes 514, 614 of first terminal plate 51 of first front bus bar 50 and terminal plate 61 of first rear bus bar 60 to spread into gaps M between four adjacent capacitor elements 101 of first capacitor group 10A. Likewise, molding resin passes through second communication through-holes 821 of second terminal plate 82 of second rear bus bar 80 to spread into a space between second terminal plate 82 and second capacitor group 10B. Furthermore, molding resin passes through first communication through-holes 714, 814 of terminal plate 71 of second front bus bar 70 and first terminal plate 81 of second rear bus bar 80 to spread into gaps M between four adjacent capacitor elements 101 of second capacitor group 10B.

After molding resin is hardened, the mold and holding jig 5 are removed, and then film capacitor 1B including capacitor unit 2B covered by outer packaging resin 3B is completed. At this time, since a space between first rear bus bar 60 and second front bus bar 70 is filled with outer packaging resin 3B, first rear bus bar 60 and second front bus bar 70 are in non-contact with each other.

As described above, film capacitor 1B of the present exemplary embodiment, as with film capacitor 1A of the first exemplary embodiment, is manufactured through the following steps: a step of assembling capacitor unit 2B; a step of fixing holding jig 5 to fixation portions 40 of capacitor unit 2B; a step of putting capacitor unit 2B hung from holding jig 5 into the inner tank of the mold; a step of injecting melted molding resin into the inner tank and hardening melted molding resin; and a step of removing, from the mold and holding jig 5, capacitor unit 2B covered by outer packaging resin 3B obtained by hardening melted molding resin.

In film capacitor 1B, four connection terminal plates 53, 62 of first bus bar B1 and four connection terminal plates 72, 83 of second bus bar B2 are exposed upward from outer packaging resin 3B. And second terminal parts 532, 622, 722, 832 of eight connection terminal plates 53, 62, 72, 83 thus exposed are electrically connected to external terminals of an external electronic device.

As illustrated in FIG. 4A and FIG. 4B, it is noted that, as with the first exemplary embodiment, line L corresponding to the top face of outer packaging resin 3B covering capacitor unit 2B is positioned above left and right legs 417, 418 of fixation portion 40 and below groove portions 413, 416 of fixation portion 40. Therefore, left and right legs 417, 418 of fixation portion 40 are entirely covered by outer packaging resin 3B, and groove portions 413, 416 of fixation portion 40 are exposed from outer packaging resin 3B.

Effects of Second Exemplary Embodiment

In capacitor unit 2B, since four fixation portions 40 to which four connection terminal plates 53, 62 of first bus bar B1 and four connection terminal plates 72, 83 of second bus bar B2 are coupled can be fixed to holding jig 5, joints to holding jig 5 (fixation portions 40, connection terminal plates 53, 62, connection terminal plates 72, 83) can have sufficient strength. This makes the joints to holding jig 5 less susceptible to deformation or shaking, thus preventing capacitor unit 2B from being put into the inner tank of the mold in an inclined state. Therefore, capacitor unit 2A can be suitably covered by outer packaging resin 3A.

Furthermore, since first terminal parts 531, 621, 721, 831 of connection terminal plates 53, 62, 72, 83 are in contact with contact faces 41a, 41b of fixation portions 40, respectively, connection terminal plates 53, 62, 72, 83 can be firmly supported by contact faces 41a, 41b, enabling the joints to holding jig 5 to have further strength.

Furthermore, since pairs of protrusions 411 of fixation portions 40 are configured to be inserted into through-holes 533, 623, 723, 833 of first terminal parts 531, 621, 721, 831 of connection terminal plates 53, 62, 72, 83, respectively, connection terminal plates 53, 62, 72, 83 can be securely fixed to fixation portions 40 such that connection terminal plates 53, 62, 72, 83 do not move vertically and horizontally.

Furthermore, since first terminal parts 531, 621, 721, 831 are configured to fit into the spaces between left and right ribs 412, 415 of fixation portions 40, connection terminal plates 53, 62, 72, 83 can be further securely fixed to fixation portions 40 such that connection terminal plates 53, 62, 72, 83 do not move horizontally.

Furthermore, even in a case where vibrations or shocks act on film capacitor 1B and a force in a direction in which fixation portions 40 gets out of outer packaging resin 3B, which is an upward force, acts on fixation portions 40, left and right legs 417, 418 of fixation portions 40 resist the force in outer packaging resin 3B, preventing the fixation portions 40 from moving upward. This prevents fixation portions 40 from being separated from outer packaging resin 3B, which prevents connection terminal plates 53, 62, 72, 83 from being damaged and the like.

Furthermore, since groove portions 413, 416 are formed on contact faces 41a, 41b of fixation portions 40, the capillary action between first terminal parts 531, 621, 721, 831 of connection terminal plates 53, 62, 72, 83 and contact faces 41a, 41b are prevented. This prevents molding resin from crawling up between first terminal parts 531, 621, 721, 831 and contact faces 41a, 41b during molding of outer packaging resin 3B. Furthermore, since groove portions 413, 416 extend up to the inner sides of left and right ribs 412, 415, crawling up of molding resin between first terminal parts 531, 621, 721, 831 and ribs 412, 415 can be prevented. This prevents molding resin from reaching second terminal parts 532, 622, 722, 832 and prevents contact failure or the like due to molding resin from occurring between second terminal parts 532, 622, 722, 832 and external terminals.

Furthermore, since first unit U1 and second unit U2 are coupled to fixation portions 40 such that first rear bus bar 60 and second front bus bar 70 is not in contact with each other, first rear bus bar 60 and second front bus bar 70 do not rub against each other even in a case where vibrations or shocks act on film capacitor 1B. Thus, first rear bus bar 60 and second front bus bar 70 are prevented from being scratched or damaged.

Furthermore, as illustrated in FIG. 7, directly below second terminal part 532 of connection terminal plate 53 of first front bus bar 50 and second terminal part 832 of connection terminal plate 83 of second rear bus bar 80, the upper end of terminal plate 61 of first rear bus bar 60 and the upper end of terminal plate 71 of second front bus bar 70, which have polarities different from the polarities of second terminal parts 532, 832, are positioned. However, since fixation portions 40 are interposed between second terminal parts 532, 832 and the upper ends of terminal plates 61, 71, contact of second terminal parts 532, 832 with terminal plates 61, 71 due to deformation in connection terminal plates 53, 83, or the like can be prevented, and thus occurrence of short-circuiting can be prevented.

Although the exemplary embodiments of the present disclosure have been described above, the present disclosure is not limited to the exemplary embodiments described above, and moreover, a variety of modifications can be applied to application examples according to the present disclosure besides the exemplary embodiments described above.

For example, in the first exemplary embodiment, front bus bar 20 includes two connection terminal plates 23, and rear bus bar 30 includes two connection terminal plates 33. However, the respective numbers of connection terminal plates 23, 33 formed on bus bars 20, 30 may be one, or three or more. In the second exemplary embodiment as well, the respective numbers of connection terminal plates 53, 62, 72, 83 formed on bus bars 50, 60, 70, 80 may be one, or three or more The number of capacitor elements 101 constituting capacitor group 10, first capacitor group 10A, and second capacitor group 10B can be changed as appropriate depending on required electrical capacitance, without being limited to the respective numbers of the first exemplary embodiment and the second exemplary embodiment.

Furthermore, as a method for coupling connection terminal plates 23, 33, 53, 62, 72, 83 to fixation portions 40, not only the methods of the first exemplary embodiment and the second exemplary embodiment using protrusions 411, 414, through-holes 233, 333, 533, 623, 723, 833, and left and right ribs 412, 415, but also any coupling method may be employed as long as connection terminal plates 23, 33, 53, 62, 72, 83 can be fixed to fixation portions 40 in at least one of the vertical direction and the horizontal direction.

Furthermore, in the second exemplary embodiment, end-face electrodes 101b on the rear side of first capacitor group 10A and end-face electrodes 101a on the front side of second capacitor group 10B have the same polarity. However, end-face electrodes 101b on the rear side of first capacitor group 10A and end-face electrodes 101a on the front side of second capacitor group 10B may have different polarities. It should be noted that each of fixation portions 40 needs to be coupled with connection terminal plates having the same polarity, which needs to replace the position of connection terminal plate 53 of first front bus bar 50 with the position of connection terminal plate 62 of first rear bus bar 60 or to replace the position of connection terminal plate 72 of second front bus bar 70 with the position of connection terminal plate 83 of second rear bus bar 80.

In addition, the exemplary embodiments of the present disclosure can be modified in various ways as appropriate within the scope of the technical idea disclosed in the claims.

Although film capacitor 1A of the first exemplary embodiment of the present disclosure is intended to be used for hybrid vehicles, and film capacitor 1B of the second exemplary embodiment is intended to be used for railway vehicles, the present disclosure is, of course, not limited to the above-described uses, and is also applicable to electronic devices of electronic devices, electric devices, industrial devices and the like.

The present disclosure is useful for film capacitors used for various electric components of electronic devices, electric devices, industrial devices, vehicles or the like.

What is claimed is:

1. A film capacitor comprising:
   a capacitor unit; and
   an outer packaging resin covering the capacitor unit, wherein:
   the capacitor unit includes:
      a capacitor group including a plurality of capacitor elements;
      a first bus bar that extracts electricity from the capacitor group;
      a second bus bar that extracts electricity from the capacitor group, the second bus bar facing the first bus bar;
      a first fixation portion to which the first bus bar is fixed; and
      a second fixation portion to which the second bus bar is fixed, the second fixation portion being different from the first fixation portion,
   the first bus bar includes a connection terminal part formed at one end of the first bus bar, the second bus bar includes a connection terminal part formed at one end of the second bus bar,
   each of the connection terminal part of the first bus bar and the connection terminal part of the second bus bar is exposed from the outer packaging resin to be connected to an external terminal,
   the connection terminal part of the first bus bar is coupled to the first fixation portion,
   the connection terminal part of the second bus bar is coupled to the second fixation portion, the first fixation portion and the second fixation portion are spaced apart along a direction from the connection terminal part of the first bus bar to the connection terminal part of the second bus bar,
   the first bus bar further includes a coupling part formed at the one end of the first bus bar, and the second bus bar further includes a coupling part formed at the one end of the second bus bar,
   the first bus bar is connected to an end-face electrode formed on one end face of each of the capacitor elements,
   the second bus bar is connected to an end-face electrode formed on another end face of each of the capacitor elements,
   the connection terminal part of the first bus bar and the coupling part of the second bus bar are coupled to the first fixation portion, and
   the connection terminal part of the second bus bar and the coupling part of the first bus bar are coupled to the second fixation portion.

2. The film capacitor according to claim 1, wherein
   each of the connection terminal part of the first bus bar and the connection terminal part of the second bus bar includes a first terminal part that has a flat plate shape, and a second terminal part that has a flat plate shape and bent with respect to the first terminal part, and
   each of the first fixation portion and the second fixation portion has a contact face that is in contact with the first terminal part.

3. The film capacitor according to claim 2, wherein:
   the contact face has a protrusion, and
   the first terminal part has a through-hole into which the protrusion is inserted.

4. The film capacitor according to claim 2, wherein the each of the first fixation portion and the second fixation portion includes two ribs that are formed on both sides of the contact face and extend along sides of the first terminal part.

5. The film capacitor according to claim 2, wherein the each of the first fixation portion and the second fixation portion has a recess on the contact face, the recess extending in a direction intersecting to a direction in which each of the connection terminal part of the first bus bar and the connection terminal part of the second bus bar is exposed from the outer packaging resin and being positioned higher than a region covered by the outer packaging resin.

6. The film capacitor according to claim 1, wherein
   each of the first fixation portion and the second fixation portion has a cuboid shape.

7. A film capacitor comprising:
   a capacitor unit; and
   an outer packaging resin covering the capacitor unit, wherein:
   the capacitor unit includes:
      a capacitor group including a plurality of capacitor elements;
      a first bus bar that extracts electricity from the capacitor group;
      a second bus bar that extracts electricity from the capacitor group, the second bus bar facing the first bus bar;
      a first fixation portion to which the first bus bar is fixed; and
      a second fixation portion to which the second bus bar is fixed, the second fixation portion being different from the first fixation portion, the first bus bar includes a connection terminal part formed at one end of the first bus bar, the second bus bar includes a connection terminal part formed at one end of the second bus bar, each of the connection terminal part of the first bus bar and the connection terminal part of the second bus bar is exposed from the outer packaging resin to be connected to an external terminal, the connection terminal part of the first bus bar is coupled to the first fixation portion, the connection terminal part of the second bus bar is coupled to the second fixation portion, the first fixation portion and the second fixation portion are spaced apart along a direction from the connection terminal part of the first bus bar to the connection terminal part of the second bus bar, each of the connection terminal part of the first bus bar and the connection terminal part of the second bus bar includes a first terminal part that has a flat plate shape, and a second terminal part that has a flat plate shape and bent with respect to the first terminal part, each of the first fixation portion and the second fixation portion has a contact face that is in contact with the first terminal part, and the each of the first fixation portion and the second fixation portion includes two ribs that are formed on both sides of the contact face and extend along sides of the first terminal part.

8. The film capacitor according to claim 7, wherein:
the contact face has a protrusion, and
the first terminal part has a through-hole into which the protrusion is inserted.

9. The film capacitor according to claim 7, wherein the each of the first fixation portion and the second fixation portion has a recess on the contact face, the recess extending in a direction intersecting to a direction in which each of the connection terminal part of the first bus bar and the connection terminal part of the second bus bar is exposed from the outer packaging resin and being positioned higher than a region covered by the outer packaging resin.

10. A film capacitor comprising:
a capacitor unit; and
an outer packaging resin covering the capacitor unit, wherein:
the capacitor unit includes:
a capacitor group including a plurality of capacitor elements;
a first bus bar that extracts electricity from the capacitor group;
a second bus bar that extracts electricity from the capacitor group, the second bus bar facing the first bus bar;
a first fixation portion to which the first bus bar is fixed; and
a second fixation portion to which the second bus bar is fixed, the second fixation portion being different from the first fixation portion,
the capacitor group includes a first capacitor group and a second capacitor group,
the first bus bar includes a first pair of bus bars, one of the first pair of bus bars is connected to an end-face electrode formed on one end face of each of capacitor elements of the first capacitor group and another of the first pair of bus bars is connected to an end-face electrode formed on another end face of each of the capacitor elements of the first capacitor group, the second bus bar includes a second pair of bus bars, one of the second pair of bus bars is connected to an end-face electrode formed on one end face of each of capacitor elements of the second capacitor group and another of the second pair of bus bars is connected to an end-face electrode formed on another end face of each of the capacitor elements of the second capacitor group, the one of the first pair of bus bars includes a first connection terminal part formed at one end of the one of the first pair of bus bars, the another of the first pair of bus bars includes a second connection terminal part formed at one end of the another of the first pair of bus bars, the one of the second pair of bus bars includes a third connection terminal part formed at one end of the one of the second pair of bus bars, the another of the second pair of bus bars includes a fourth connection terminal part formed at one end of the another of the second pair of bus bars, each of the first connection terminal part, the second connection terminal part, the third connection terminal part, and the fourth connection terminal part is exposed from the outer packaging resin to be connected to an external terminal, the first connection terminal part and the third connection terminal part are coupled to the first fixation portion, the second connection terminal part and the fourth connection terminal part are coupled to the second fixation portion, and the first fixation portion and the second fixation portion are spaced apart along a direction from the first connection terminal part to the second connection terminal part.

11. The film capacitor according to claim 10, wherein
each of the first connection terminal part, the second connection terminal part, the third connection terminal part, and the fourth connection terminal part includes a first terminal part that has a flat plate shape, and a second terminal part that has a flat plate shape and bent with respect to the first terminal part, and the each of the first fixation portion and the second fixation portion has a contact face that is in contact with the first terminal part.

12. The film capacitor according to claim 11, wherein:
the contact face has a protrusion, and
the first terminal part has a through-hole into which the protrusion is inserted.

13. The film capacitor according to claim 11, wherein the each of the first fixation portion and the second fixation portion includes two ribs that are formed on both sides of the contact face and extend along sides of the first terminal part.

14. The film capacitor according to claim 11, wherein the each of the first fixation portion and the second fixation portion has a recess on the contact face, the recess extending in a direction intersecting to a direction in which each the first connection terminal part, the second connection terminal part, the third connection terminal part, and the fourth connection terminal part is exposed from the outer packaging resin and being positioned higher than a region covered by the outer packaging resin.

15. A film capacitor comprising:
a capacitor unit; and
an outer packaging resin covering the capacitor unit,
wherein:
the capacitor unit includes:
- a capacitor group including a plurality of capacitor elements;
- a first bus bar that extracts electricity from the capacitor group;
- a second bus bar that extracts electricity from the capacitor group, the second bus bar facing the first bus bar;
- a first fixation portion to which the first bus bar is fixed; and
- a second fixation portion to which the second bus bar is fixed, the second fixation portion being different from the first fixation portion, the first bus bar includes a connection terminal part formed at one end of the first bus bar, the second bus bar includes a connection terminal part formed at one end of the second bus bar, each of the connection terminal part of the first bus bar and the connection terminal part of the second bus bar is exposed from the outer packaging resin to be connected to an external terminal, the connection terminal part of the first bus bar is coupled to the first fixation portion, the connection terminal part of the second bus bar is coupled to the second fixation portion, the first fixation portion and the second fixation portion are spaced apart along a direction from the connection terminal part of the first bus bar to the connection terminal part of the second bus bar, and the each of the first fixation portion and the second fixation portion includes a protrusion formed in a region covered by the outer packaging resin, the protrusion protruding in a direction intersecting to a direction in which the each of the first fixation portion and the second fixation portion gets out of the outer packaging resin.

* * * * *